United States Patent
Glenn et al.

(10) Patent No.: US 7,898,964 B1
(45) Date of Patent: Mar. 1, 2011

(54) QUEUE INFORMATION MONITORING SYSTEM AND METHOD

(75) Inventors: Kenneth D. Glenn, Olathe, KS (US); Robert K. House, Overland Park, KS (US); Alan S. Krause, Fairway, KS (US); Cindy S. Tam, Potomac, MD (US)

(73) Assignee: Sprint Communications Company L.P., Overland Park, KS (US)

( * ) Notice: Subject to any disclaimer, the term of this patent is extended or adjusted under 35 U.S.C. 154(b) by 449 days.

(21) Appl. No.: 11/869,783

(22) Filed: Oct. 10, 2007

(51) Int. Cl.
*G01R 31/08* (2006.01)
(52) U.S. Cl. .................... 370/241; 370/388; 370/412
(58) Field of Classification Search .................. 709/224; 370/229, 233, 389, 241–253, 386, 388, 412
See application file for complete search history.

(56) References Cited

U.S. PATENT DOCUMENTS

| | | | | |
|---|---|---|---|---|
| 6,091,708 A * | 7/2000 | Matsunuma | ................ | 370/233 |
| 6,091,709 A * | 7/2000 | Harrison et al. | ............ | 370/235 |
| 6,944,174 B1 * | 9/2005 | Chow | ............................ | 370/413 |
| 7,127,507 B1 * | 10/2006 | Clark et al. | .................. | 709/224 |
| 2003/0050956 A1 * | 3/2003 | Janssen et al. | ............... | 709/201 |
| 2006/0136932 A1 * | 6/2006 | Bose et al. | .................... | 719/314 |
| 2008/0137540 A1 * | 6/2008 | Botvich | ...................... | 370/241 |

* cited by examiner

*Primary Examiner* — Dang T Ton
*Assistant Examiner* — Robert M Morlan

(57) ABSTRACT

Systems and methods are provided for monitoring messages through a plurality of queues. Information associated with a channel entry of a message exiting a first queue is obtained. Information associated with the channel entry of the message exiting a second queue is obtained. The information is communicated to a monitoring component for the message. The information from the monitoring component is displayed to enable a user to determine a queue status.

23 Claims, 2 Drawing Sheets

QUEUE INFORMATION MONITORING SYSTEM AND METHOD

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

Large business enterprises typically include computer systems that need to be monitored for efficiencies and for other reasons. Monitoring the computer system may promote analysis of application processing and management of application operating conditions. Examples of such systems are mainframe and PC computer networks, which may include queues for handling message requests. One place that processing delays may occur is in message queues that typically receive and field requests from the computer system for information and services. Message queuing is a method of application-to-application communication, such as communication between an application that services a user and an application that retrieves data from a database. Applications may communicate by writing and reading application-specific data, or messages, to and from queues, without having a dedicated synchronous link between the applications. Messaging means that applications communicate with each other by sending discrete amounts of data in messages to some intermediary, and not necessarily by calling each other directly. Queuing implies that applications communicate through queues, which removes the requirement for both the sending application and the receiving application to execute concurrently. In other words, the sending and receiving of messages is asynchronous; and there is no time dependency between sending and receiving except that which may be imposed by the applications themselves.

SUMMARY OF THE INVENTION

According to some embodiments, the present disclosure is directed to a system for monitoring messages through a plurality of queues. The system includes a monitoring component, a module, and a user interface. The module obtains information associated with a channel exit of a message entering a first queue, the message in a first transmission queue, a channel entry of the message exiting the first queue, a channel exit of the message entering a second queue, the message in a second transmission queue, and a channel entry of the message exiting the second queue. The module also communicates the information to the monitoring component. The user interface displays the information from the monitoring component to enable a user to determine a status of the plurality of queues.

According to other embodiments, the present disclosure is directed to a method for monitoring messages through a plurality of queues. A header of a message is checked to determine whether to obtain information. Information associated with a channel entry of the message exiting a first queue is obtained based on the header of the message. Information associated with the channel entry of the message exiting a second queue is obtained based on the header of the message. The information is communicated to a monitoring component. The information from the monitoring component is displayed to enable a user to determine a status of the message through the plurality of the queues.

According to other embodiments, the present disclosure is directed to a system for monitoring messages through a plurality of queues. The system includes a monitoring component, a first queue manager, a second queue manager, and a user interface. The first queue manager determines whether to obtain information for a message. The first queue manager also obtains information associated with a channel exit of the message entering a first queue and communicates the information to the monitoring component in response to determining to obtain information for the message. The second queue manager determines whether to obtain information for the message. The second queue manager also obtains information associated with a channel exit of the message entering a second queue and communicates the information to the monitoring component for the message in response to determining to obtain information for the message. The user interface displays the information from the monitoring component to enable a user to determine a queue status.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION OF THE PREFERRED EMBODIMENTS

Figure 1:
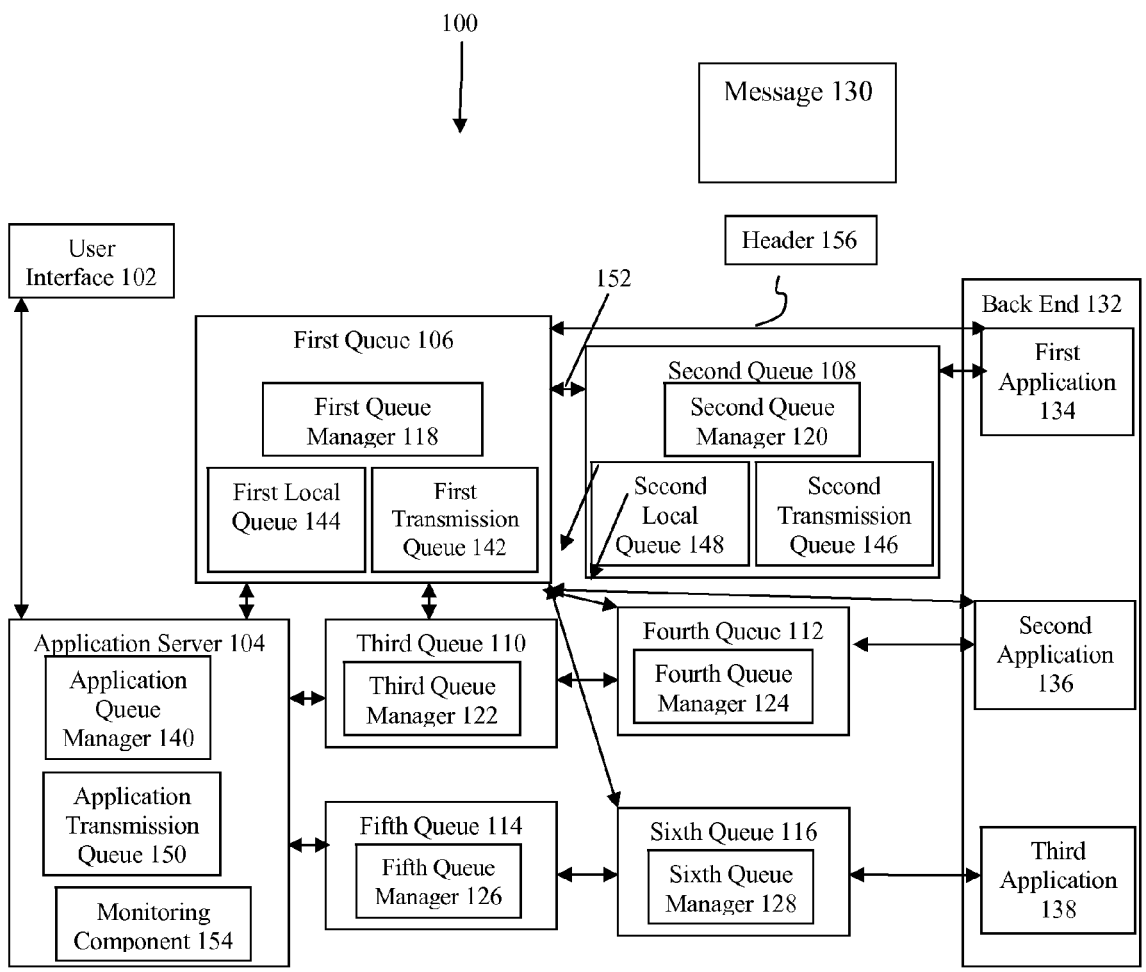
FIG. 1 is a block diagram that depicts a system for monitoring messages through a plurality of queues according to embodiments of the present disclosure.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

When application processing delays are encountered during development, testing, or following the installation of new applications on large systems, the new application developers may attribute any processing delays to incorrectly configured message queues because the developers believe that the new applications are completely debugged. Such processing delays are often evaluated by assigning individuals to manually monitor each message queue in the system to determine whether a queue is responsible for the processing delays. This message queue monitoring is a process that is lengthy, tedious, and an inefficient allocation of enterprise resources.

The present system provides, according to embodiments of the present disclosure, a monitoring component that automatically collects information associated with various queues, such that individuals do not have to waste time watching each separate queue to monitor messages traveling through queues. In some embodiments, information such as the message exiting the queues may be reported. The information is communicated to the monitoring component, which can compare the information obtained at various queues to determine the status as the message travels through a system of queues. The information from the monitoring component is displayed to enable a user to determine a queue status. For example, if the message spent too much time between exiting a first queue and exiting a second queue, a processing problem may exist for the second queue because the message spent too much time in the second queue.

In some embodiments, queue managers may be alerted or otherwise monitor information for a message, thereby obtaining information only for selected messages and lessening monitoring loads. For example, a queue manager may check a header of a message to determine whether to obtain information for the message. If the message is selected, the queue managers obtain information such as, but not limited to, the message entering queues, and the queue managers communicate the information to the monitoring component. The monitoring component can compare the information obtained at various queues to determine the status of the message traveling through a system of queues. The user interface displays the information from the monitoring component to enable a user to determine a message status. For example, if the message spent too much time between entering a first queue and entering a second queue, a problem may exist for the channel between the first queue and the second queue because the message spent too much time in the first queue.

In some embodiments, a module associated with a message may gather information associated with the message entering queues, the message exiting queues, and the message in queues, for example. The information can include queue depth. The module communicates the gathered information to the monitoring component, which can compare the information obtained at various queues to determine the status of the queues. The user interface displays the information from the monitoring component to enable a user to determine the status of the queues. For example, if a queue depth is too deep, a processing problem may exist for the associated queue.

Turning now to FIG. 1, a block diagram illustrates a system 100 for monitoring messages through a plurality of queues according to some embodiments of the present disclosure. The system 100 includes a user interface 102 that enables a user of the system to view information to monitor messages in the system 100. The system 100 has an application server 104 that includes application software that can request data from data stores or databases or other functions or services from background applications. The term data store, as used herein, includes any system or component for storing or maintaining data, which includes, but is not limited to, databases. An application may obtain the data from a data store directly or obtain the data by going through queues, such as other data services or other applications, based on a particular request. In some embodiments, for example, the application may make a request of a data repository host and the data repository host may actually retrieve the data, make updates and otherwise process the request and return information or instructions to the application.

Messages, such as data requests made by applications in the application server 104, can travel through a cluster of queues in the system 100 before reaching the data store or backend application. The cluster of queues enable applications in the application server 104 to communicate with the data store or other services by using message queuing, such that a dedicated synchronous link between the application and the backend systems is not required. The cluster of queues can include a first queue 106, a second queue 108, a third queue 110, a fourth queue 112, a fifth queue 114, and a sixth queue 116. Each queue in the cluster of queues may include a queue manager to determine whether messages received are intended for the queue or intended to be temporarily stored and subsequently forwarded to another queue. For example, the first queue 106 includes a first queue manager 118, the second queue 108 includes a second queue manager 120, the third queue 110 includes a third queue manager 122, the fourth queue 112 includes a fourth queue manager 124, the fifth queue 114 includes a fifth queue manager 126, and the sixth queue 116 includes a sixth queue manager 128. Each queue manager manages a transmission queue and a local queue. The queues and queue managers may be located on separate servers, or one or more queues may be located on the same server.

After a message 130 has traveled through the cluster of queues, the message 130 reaches a back end 132 server of the system 100. The back end 132 includes a first application 134, a second application 136, and a third application 138, which can be application that provide or access data or provide other services.

The application server 104 has an application queue manager 140 that determines where a message will be initially sent to communicate with the applications at the back end 132. For example, the application queue manager 126 sends a first message from a first application to a first transmission queue 142. The first queue manager 118 takes the first message from the first transmission queue 142 and puts the first message on a first local queue 144, which provides the message directly to the first application 134 in the back end 132. In another example, the application queue manager 140 sends a second message from a second application to the first transmission queue 142, which forwards the message to a second transmission queue 146. The second queue manager 120 takes the second message from the second transmission queue 146 and puts the second message on a second local queue 148, which in turn provides the message directly to the first application 134 in the back end 132, which results in message queuing with multiple queues.

The first queue 106 may be, like other queues in the system 100, for example, an IBM MQ Series message queue, a Java® Message Service (JMS), or other message services known to one of ordinary skill in the art that may be employed. The first transmission queue 142 receives messages from various applications throughout the enterprise. The messages may request specific data. The first queue manager 118 evaluates messages received on the first transmission queue 142, and determines whether each message can be serviced locally by the first local queue 144 or needs to be forwarded to another queue.

If the first queue manager 118 determines that the message 130 can be serviced locally by the first local queue 144, the first queue manager 130 transfers the message to the first local queue 144. Subsequently, resources on the back end 132 check the first local queue 144 for messages that can be serviced locally, and provide the data requested by the message. After the resources on the back end 132 provide the data requested by the message 130, the first queue manager 118 transfers the message from the first local queue 144 back to the first transmission queue 142. The first transmission queue 142 then returns the message with the requested data back to an application transmission queue 150 for the requesting application on the application server 104.

In contrast, if the first queue manager 118 determines that the message 130 cannot be serviced locally by the first local queue 144, the first queue manager 118 can forward the message in the first transmission queue 142 to another queue. The first queue manager 118 can forward the message to a transmission queue associated with a local queue that directly services the message or to a transmission queue that forwards the message on to yet another transmission queue. The local queue that directly services the message is the destination queue for the message.

For example, the first queue manager 118 forwards the message in the first transmission queue 142 to the second transmission queue 146. The message in the first transmission queue 142 is communicated to the second transmission queue 146 through a communications channel 152. Although the channel 152 is depicted in FIG. 1 as enabling communication between the first transmission queue 142 in the first queue 106 and the second transmission queue 146 in the second queue 108, the channel 152 can enable communication between the first transmission queue 142 and the second transmission queue 146 even if both transmission queues are located in the first queue 106.

Each channel in the system that enables communication between transmission queues is identified by a channel identifier. For example, the channel 152 can be identified as "first to second transmission queue", the unique channel that enables communication between the first transmission queue 142 and the second transmission queue 146. The message 130 invokes a channel exit when the message exits a channel, such as channel 152, to a transmission queue at a specific time. A channel exit is a user-written program that can be executed from one of a defined number of points in the program execution flow during channel operation. A channel exit can be invoked once per message on each side of the channel, that is, after the message is taken off the first transmission queue and before the message is put on the second transmission queue. Although the term channel exit is well known to those in the art as describing what can be invoked at both sides of a channel, for purposes of this disclosure a channel exit can be invoked when a message exits a channel to a transmission queue and a channel entry can be invoked when a message enters a channel from a transmission queue. For example, a channel exit can be invoked when the message exits the channel 152 to the second transmission queue 146. In another example, a channel entry can be invoked when the message enters the channel 152 from the first transmission queue 142.

The second queue manager 120 evaluates messages received on the second transmission queue 146, and determines whether each message can be serviced locally by the second local queue 148 or needs to be forwarded to another transmission queue. If the second queue manager 120 determines that the message 130 can be serviced locally by the second local queue 148, the second queue manager 120 transfers the message to a second local queue 148, which functions similarly to the first local queue 144. If the second local queue 148 is a queue that is serviced by the applications in the back end 132, the second local queue 148 may be the destination queue for the message 130. The numbers of user interfaces, monitoring components, application servers, clustered queues, back end servers, queue managers, transmission queues, and local queues in the system 100 are depicted in FIG. 1 for the purpose of an illustrative example only, as the system 100 can include any number of user interfaces, monitoring components, application servers, clustered queues, back end servers, queue managers, transmission queues, and local queues.

The application queue manager 140 may monitor the sequence of queues in the cluster to which the application queue manager 140 sends messages, and use this sequence to load balance and distribute the messages equally between the queues over time. The application queue manager 140 may perform other functions well known to one skilled in the art.

The system 100 also includes a monitoring component 154, which receives information to enable the monitoring of messages traveling through the queues in the system 100. A header 156 in the message 130 can request queue managers in the system 100 to send information to the monitoring component as the message travels through the queues in the system 100. Although depicted as part of the application server 104, the monitoring component 154 can be located elsewhere in the system 100.

Figure 2:
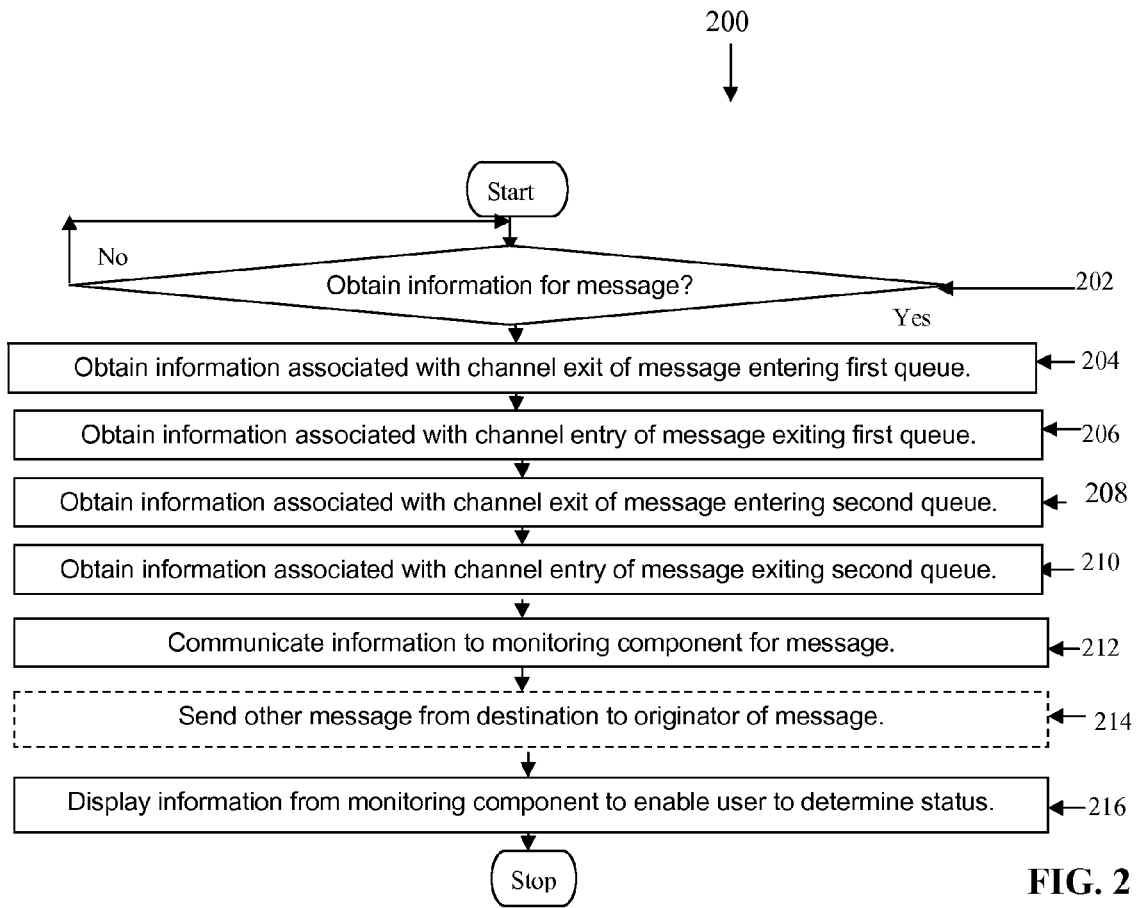
FIG. 2 is a flowchart that depicts a method for monitoring messages through a plurality of queues according to embodiments of the present disclosure.

Turning now to FIG. 2, a flowchart illustrates a method 200 for monitoring messages through a plurality of queues according to embodiments of the present disclosure. Executing the method enables a user to monitor messages in the system 100 by obtaining information associated with each message as it travels through queues in the system 100. The information obtained can be information associated with a queue manager, a local queue, a transmission queue, a destination queue, a channel identifier, a time for the channel exit of the message entering a queue, and another time for the channel entry of the message exiting the queue.

In box 202, a first queue manager determines whether to obtain information for a message. For example, the first queue manager 118 determines whether to obtain information for the message 130 in the first transmission queue 142. A queue manager can check a flag in the header 156 of the message 130 to determine whether to obtain information for the message 130. If the first queue manager 118 determines to obtain information for the message 130 in the first transmission queue 142, the method continues to box 204. If the first queue manager 118 determines not to obtain information for the message 130 in the first transmission queue 142, the method returns to box 202 to determine if information is to be obtained for subsequent messages.

In box 204, the first queue manager obtains information associated with a channel exit of the message entering the first queue. For example, the first queue manager 118 obtains information associated with a channel exit of the message 130 entering the first transmission queue 142, such as the channel identifier for the channel 152 that the message 130 exited, the first transmission queue 142, and the time that the message 130 entered the first transmission queue 142. The information can also identify the first queue manager 118, the first local queue 144, and a destination queue that is directly serviced by the applications 134-138 in the back end 132.

In box 206, the first queue manager obtains information associated with the channel entry of the message exiting the first queue. For example, the first queue manager 118 obtains information associated with the channel entry of the message 130 exiting the first transmission queue 142, such as the channel identifier for the channel 152 that the message 130 entered, the first transmission queue 142, and the time that the message 130 exited the first transmission queue 142. The information can also identify the first queue manager 118, the first local queue 144, and a destination queue that is directly serviced by the applications 134-138 in the back end 132.

In box 208, a second queue manager obtains information associated with a channel exit of the message entering a second queue. Additionally, similar to the first queue manager, the second queue manager can optionally determine whether to obtain information for a message. For example, the second queue manager 120 obtains information associated with a channel exit of the message 130 entering the second transmission queue 146, such as the channel identifier for the channel 152 that the message 130 exited, the second transmission queue 146, and the time that the message 130 entered the second transmission queue 146. The information can also identify the second queue manager 120, the second local queue 148 and a destination queue that is directly serviced by the applications 134-138 in the back end 132.

In box 210, the second queue manager obtains information associated with the channel entry of the message exiting the second queue. For example, the second queue manager 120 obtains information associated with the channel entry of the message 130 exiting the second transmission queue 146, such as the channel identifier for the channel that the message 130 entered, the second transmission queue 146, and the time that the message 130 exited the second transmission queue 146. The information can also identify the second queue manager 120, the second local queue 148, and a destination queue that is directly serviced by the applications 134-138 in the back end 132.

In box 212, information is communicated to a monitoring component. For example, the first queue manager 118 communicates information for the message 130 to the monitoring component 154. The first queue manager 118 can communicate information for the message 130 to the monitoring component 154 when the message 130 enters the first transmission queue 142 or when the message 130 exits the first transmission queue 142. Additionally, the first queue manager 118 can communicate information for the message 130 to the monitoring component 154 both when the message 130 enters the first transmission queue 142 and when the message 130 exits the first transmission queue 142. Likewise, the second queue manager 120 can communicate information for the message 130 to the monitoring component 154 when the message 130 enters the second transmission queue 146 or when the message 130 exits the second transmission queue 146. Additionally, the second queue manager 120 can communicate information for the message 130 to the monitoring component 154 when the message 130 enters the second transmission queue 146 and when the message 130 exits the second transmission queue 146.

As an alternative to communicating information to the monitoring component 154 as the message 130 enters and exits each transmission queue, the message 130 can obtain all of this information. When the message 130 reaches its destination queue, a queue manager that manages the destination queue can communicate all of the information obtained by the message 130 while entering and exiting previous transmission queues. For example, the second queue manager 120 can communicate all of the information previously obtained for the message 130 to the monitoring component 154 when the message 130 reaches the second local queue 148 if the second local queue 148 is the destination queue for the message 130.

In box 214, the second queue manager may optionally send a message to the originator of the message. For example, the second queue manager 120 sends a message from the destination of the second local queue 148 to the application that originated the message 130 in the application server 104. By sending another message, the second queue manager 120 enables a user of the system 100 to monitor another message through the queues in the system 100, where the other message travels through the queues in the reverse direction from the original message, obtaining information along the way.

In box 216, the user interface displays information from the monitoring component to enable a user to determine a status. For example, the user interface 102 displays information from the monitoring component 154 to enable a user to determine the status of the first transmission queue 142. The monitoring component 154 can calculate the duration between the time for the channel exit of the message 130 entering the first transmission queue 142 and the time for the channel entry of the message 130 exiting the first transmission queue 142 as the time that the message 130 spent in the first transmission queue 142. If the time spent in the first transmission queue 142 is longer than anticipated, the duration of time may indicate that the first transmission queue 142 is incorrectly configured or that an error exists in the message processing for the first queue manager 118.

In another example, the user interface 102 displays information from the monitoring component 154 to enable a user to determine the status of the message 130, which can indicate problems for the channels that communicated the message 130. The monitoring component 154 can calculate the duration between the time for the channel exit of the message 130 exiting the first transmission queue 142 and the time for the channel entry of the message 130 entering the second transmission queue 146 as the time that the message 130 spent in the communications channel 152. If the time spent in the communications channel 152 is longer than anticipated, the duration of time may indicate that the communications channel 152 is incorrectly configured, such that the communications channel 152 may need to be restarted.

Although boxes 204 to 214 illustrate queue managers monitoring messages through queues in the system 100, a module can replace or enhance the function of the queue managers in obtaining information and communicating information to the monitoring component 154. The module can include executable code that is executed when the message 130 is in a queue. The module can also be information embedded in the header 156 that initiates the execution of code that is located elsewhere. For example, the module obtains information associated with the message 130 in the first transmission queue 142, such as the depth of the first transmission queue 142, which indicates how many messages are currently waiting on the first transmission queue 142 for processing by the first queue manager 118.

The module can obtain information associated with a channel exit of the message 130 entering a first queue, such as the first transmission queue 142, obtain the information associated with the message 130 in a first transmission queue, and obtain the information associated with the channel entry of the message 130 exiting the first queue. Furthermore, the module can obtain information associated with the channel exit of the message 130 entering a second queue, such as the second transmission queue 146, obtain the information associated with the message 130 in a second transmission queue, and obtain the information associated with the channel entry of the message 130 exiting the second queue. Additionally, the module can communicate the information to the monitoring component for the message 130, such as the monitoring component 154, either upon each channel exit and channel entry, or when the message 130 reaches its destination. The module can communicate the information to the monitoring component 154 when the message 130 is still in the first transmission queue 142.

For example, a queue depth that is relatively large can indicate that the first transmission queue 142 is not processing its messages in a timely manner, such that either the first transmission queue 142 is incorrectly configured or that an error exists in the message processing for the first queue manager 118. Either possibility can be responsible for delays in processing messages.

Figure 3:
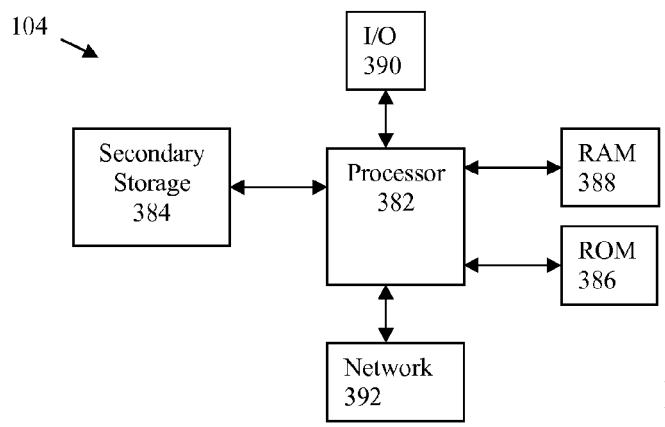
FIG. 3 illustrates an exemplary general purpose computer system suitable for implementing the several embodiments of the disclosure.

Parts of the system described above may be implemented on any general-purpose server with sufficient processing power, memory resources, and network throughput capability to handle the necessary workload placed upon it. FIG. 3 illustrates a server, such as the application server 104, which is suitable for implementing one or more embodiments disclosed herein. The application server 104 includes a processor 382 (which may be referred to as a central processor unit or CPU) that is in communication with memory devices including secondary storage 384, read only memory (ROM) 386, random access memory (RAM) 388, input/output (I/O) 390 devices, and network connectivity devices 392. The processor may be implemented as one or more CPU chips.

The secondary storage 384 is typically comprised of one or more disk drives or tape drives and is used for non-volatile storage of data and as an over-flow data storage device if the RAM 388 is not large enough to hold all working data. The secondary storage 384 may be used to store programs which are loaded into the RAM 388 when such programs are selected for execution. The ROM 386 is used to store instructions and perhaps data which are read during program execution. The ROM 386 is a non-volatile memory device which typically has a small memory capacity relative to the larger memory capacity of secondary storage. The RAM 388 is used to store volatile data and perhaps to store instructions. Access to both the ROM 386 and the RAM 388 is typically faster than to the secondary storage 384.

The I/O devices 390 may include printers, video monitors, liquid crystal displays (LCDs), touch screen displays, keyboards, keypads, switches, dials, mice, track balls, voice recognizers, card readers, paper tape readers, or other well-known input devices, such as the user interface 102. The network connectivity devices 392 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 392 may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using the processor 382, may be received from and outputted to the network, for example, in the form of a computer data signal embodied in a carrier wave.

Such information, which may include data or instructions to be executed using the processor 382 for example, may be received from and outputted to the network, for example, in the form of a computer data baseband signal or signal embodied in a carrier wave. The baseband signal or signal embodied in the carrier wave generated by the network connectivity devices 392 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 382 executes instructions, codes, computer programs, scripts which it accesses from hard disk, floppy disk, optical disk (these various disk based systems may all be considered the secondary storage 384), the ROM 386, the RAM 388, or the network connectivity devices 392.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A system for monitoring messages through a plurality of queues, comprising:
   a monitoring component;
   a module to obtain information associated with a channel exit of a particular message entering a first queue, information associated with the particular message in a first transmission queue, and information associated with the channel entry of the particular message exiting the first queue, the module to obtain information associated with the channel exit of the particular message entering a second queue, information associated with the particular message in a second transmission queue, and information associated with the channel entry of the particular message exiting the second queue, and the module further to communicate the information associated with the particular message to the monitoring component; and
   a user interface to display the information from the monitoring component to enable a user to determine a status of the particular message.

2. The system of claim 1, wherein the information comprises information associated with a queue manager, a local queue, a transmission queue, the destination queue, and a queue depth for each of the first queue and the second queue.

3. The system of claim 1, wherein the user interface is further configured to display the information from the monitoring component to enable the user to determine the status of the particular message.

4. The system of claim 1, wherein the information comprises a channel identifier, a time for the channel exit of the particular message entering the first queue and an other time for the channel entry of the particular message exiting the first queue.

5. The system of claim 1, wherein the module is further operable to send the information to the monitoring component when the particular message is in the transmission queue.

6. The system of claim 1, wherein the module comprises executable code.

7. A method for monitoring messages through a plurality of queues, comprising:
- checking a header of a particular message to determine whether to obtain information for the particular message;
- obtaining information associated with a channel entry of the particular message exiting a first queue based on the header of the particular message;
- obtaining information associated with the channel entry of the particular message exiting a second queue based on the header of the particular message;
- communicating the information associated with the particular message to a monitoring component; and
- displaying the information associated with the particular message from the monitoring component to enable a user to determine a status of the particular message through the plurality of queues.

8. The method of claim 7, further comprising:
- obtaining information associated with a channel exit of the particular message entering the first queue based on the header of the particular message;
- obtaining information associated with the channel exit of the particular message entering the second queue based on the header of the particular message.

9. The method of claim 7, wherein the information comprises information associated with a queue manager, a local queue, a transmission queue, and the destination queue.

10. The method of claim 7 wherein the information comprises information related to a channel identifier, a time for the channel exit of the particular message entering the first queue and an other time for the channel entry of the particular message exiting the first queue.

11. The method of claim 7, further comprising displaying the information from the monitoring component to enable a user to determine a status of the plurality of queues.

12. The method of claim 7, wherein communicating the information to the monitoring component comprises sending the information to the monitoring component upon each channel exit.

13. The method of claim 7, wherein communicating the information to the monitoring component comprises sending the information to the monitoring component upon each channel entry.

14. The method of claim 7, wherein communicating the information to the monitoring component comprises sending the information to the monitoring component upon the particular message reaching a destination.

15. The method of claim 14, further comprising sending an other message from the destination to an originator of the particular message.

16. The method of claim 7, further comprising using the particular message status to determine whether to restart a channel.

17. A system for monitoring messages through a plurality of queues, comprising:
- a monitoring component;
- a first queue manager to determine whether to obtain information for a particular message, to obtain information associated with a channel exit of the particular message entering a first queue and to communicate the information associated with the particular message to the monitoring component;
- a second queue manager to determine whether to obtain information for the particular message, to obtain information associated with the channel exit of the particular message entering the second queue and to communicate the information associated with the particular message to the monitoring component; and
- a user interface to display the information associated with the particular message from the monitoring component to enable a user to determine a status of the first queue and the second queue.

18. The system of claim 17, wherein the user interface is further configured to display the information from the monitoring component to enable a user to determine a status of the particular message.

19. The system of claim 17, wherein the first queue manager is further operable to obtain the information associated with the channel entry of the particular message exiting the first queue and the second queue manager is further operable to obtain the information associated with the channel entry of the particular message exiting the second queue.

20. The system of claim 19, wherein the first queue manager and the second queue manager are further operable to check a flag in a header for the particular message to determine whether to obtain information for the particular message.

21. The system of claim 1, wherein the module is further configured to communicate the information associated with the particular message to the monitoring component in response to at least one of the particular message entering the first queue, the particular message exiting the first queue, the particular message entering the second queue, the particular message exiting the second queue, and the particular message reaching a destination queue.

22. The system of claim 1, wherein the user interface is further configured to display the information from the monitoring component to enable a user to determine a status of a channel between the first queue and the second queue.

23. The system of claim 1, wherein the user interface is further configured to display the information from the monitoring component to enable a user to determine a status of the plurality of queues.

* * * * *